Aug. 11, 1953     S. L. BRADLEY     2,648,813
REGULATING SYSTEM
Filed March 14, 1951     2 Sheets-Sheet 1
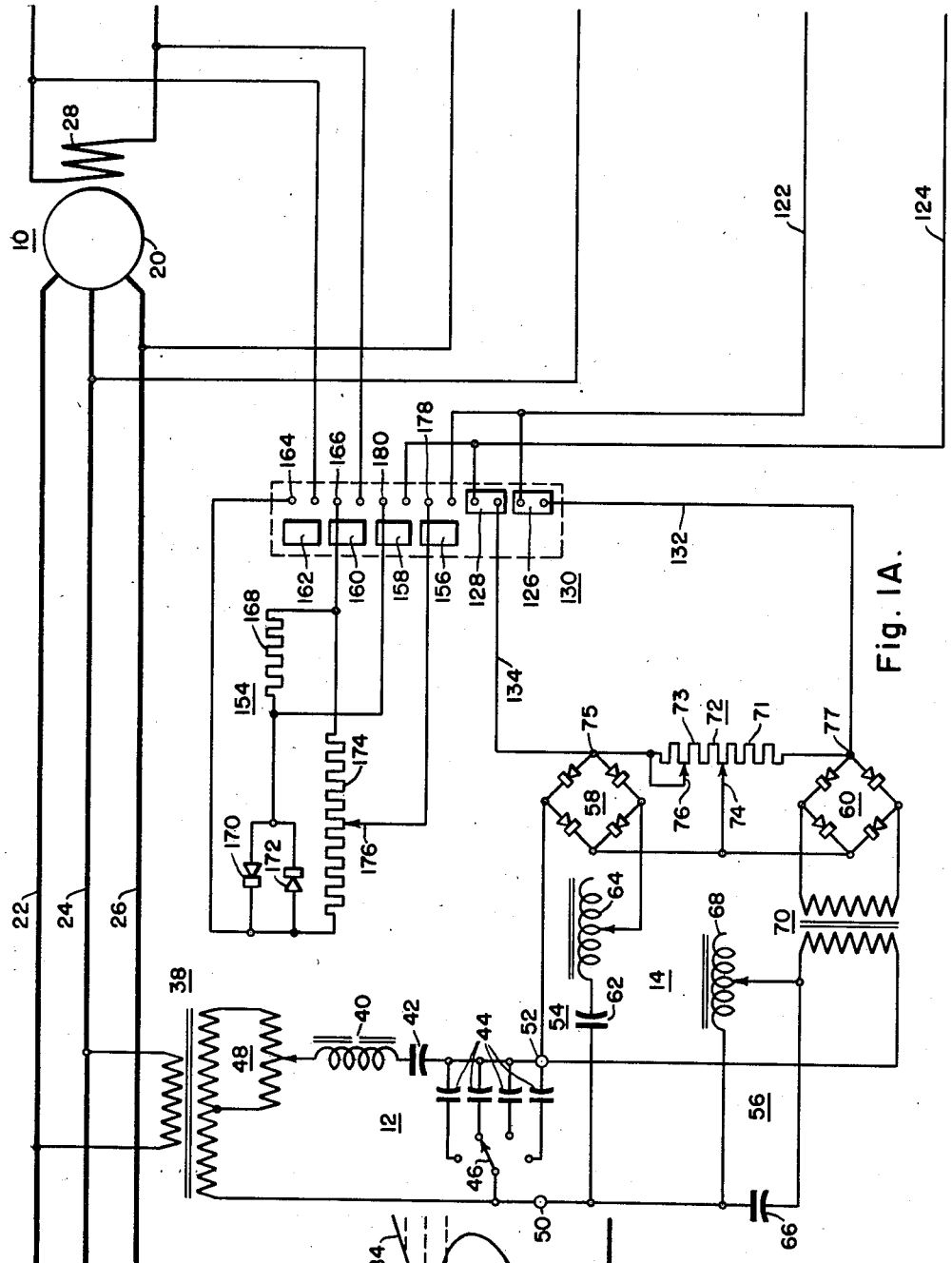
Fig. IA.
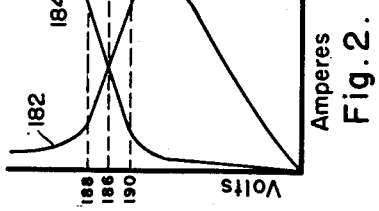
Fig. 2.
WITNESSES:
Robert C. Baird
K. W. Thomas
INVENTOR
Schuyler L. Bradley.
BY
James N. Ely
ATTORNEY

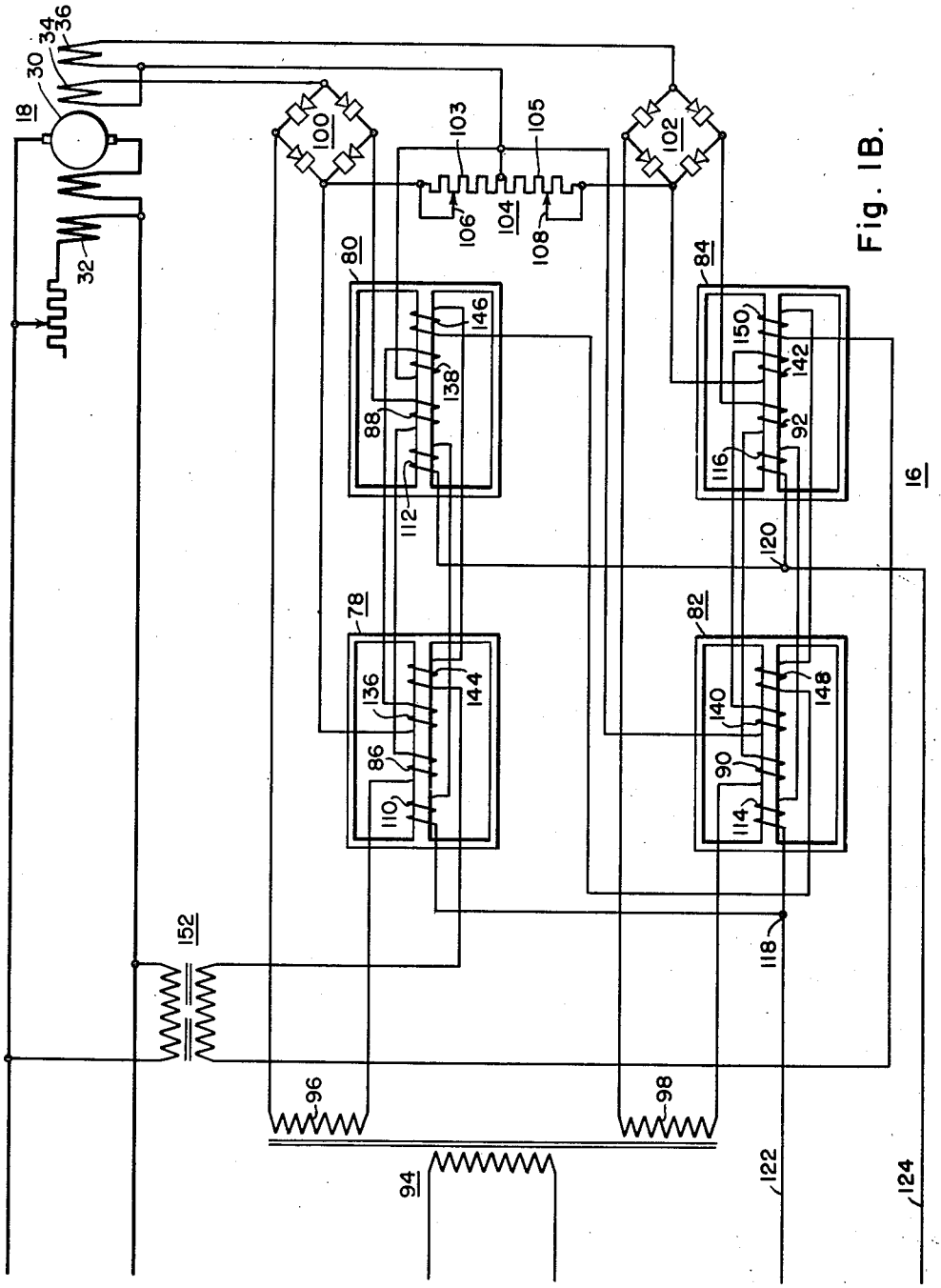

Patented Aug. 11, 1953

2,648,813

UNITED STATES PATENT OFFICE 2,648,813

REGULATING SYSTEM

Schuyler L. Bradley, Pittsburgh, Pa., assignor to Westinghouse Electric Corporation, East Pittsburgh, Pa., a corporation of Pennsylvania Application March 14, 1951, Serial No. 215,547

3 Claims. (Cl. 322—28)

This invention relates to regulating systems and particularly, to regulating systems embodying a voltage reference network.

Regulating systems have been utilized which embodied voltage reference networks for detecting a departure of the output voltage of a generator from its regulated value, and the output of such networks have been amplified and used to effect a change in the excitation of the generator to return the output voltage of the generator to a predetermined value which is to be maintained. However, in these regulating systems heretofore used, only a small percentage of the power input to the voltage reference network was utilized in returning the output voltage of the generator to its regulated value.

The loss of power caused by the inefficient voltage reference network increased the initial cost of the regulating system since it was necessary to provide large component parts for the regulating system.

An object of this invention is the provision of a regulating system having a sensitive voltage reference network in which a relatively large percentage of the power input to the voltage reference network is used in effecting a regulating action.

Another object of this invention is the provision in a regulating system for maintaining the output voltage of a generator substantially constant of a voltage reference network having two non-linear impedance circuits which have predetermined voltage-current characteristics, and in which a relatively large percentage of the power input to the voltage reference network is utilized in returning the output voltage of the generator to its regulated value.

Still another object of this invention is the provision of an efficient voltage reference network utilizing two non-linear impedance circuits having predetermined voltage-current characteristics.

Other objects of this invention will become apparent from the following description when taken in conjunction with the accompanying drawings, in which:

Figures 1A and 1B are composite diagrammatic representations of apparatus and circuits embodying the teachings of this invention, and Fig. 2 is a graph, the curves of which represent the electrical characteristics of the two non-linear impedance circuits utilized in the system of Figs. 1A and 1B.

Referring to the drawings and, in particular, to Figures 1A and 1B thereof, there is illustrated a regulating system utilized for maintaining the output voltage of a generator 10 substantially constant. The regulating system comprises, in general, a frequency-compensating network 12, a voltage reference network 14 and a magnetic amplifier 16 disposed to control the excitation of a regulating generator 18, the output of which is disposed to control the excitation of the generator 10. In this instance, the generator 10 comprises a field winding 28 and armature windings 20 connected to supply load conductors 22, 24 and 26. The field winding 28 is disposed to be energized in accordance with the output of a regulating generator 16, the generator 18 illustrated comprising armature windings 30, a self-excited field winding 32, and a pair of opposed control windings 34 and 36.

In order to provide a measure of the output of the generator 10, the voltage of which is to be maintained substantially constant, the frequency compensator 12 is connected through a potential transformer 38, the primary windings of which are connected across the load conductors 22 and 24. As will be understood, many different frequency compensators may be employed, the frequency compensator in this instance comprising a series-connected compensating reactor 40 and a capacitor 42, and a bank of capacitors 44 of different size disposed to be selectively connected across the circuit by an adjustable contact member 46. Thus, the position of the contact member 46 for selectively connecting one of the capacitors 44 in circuit depends upon the frequency of the generator 10 which is to be compensated for. As illustrated, the frequency compensator 12 is connected to the secondary winding of the transformer 38 through a voltage divider 48 for the purpose of adjusting the voltage output which is obtained across the output terminals 50 and 52 of the compensator.

In order to provide a sensitive measuring circuit for measuring the deviations of the voltage across the load conductors 22 and 24, the voltage reference network 14 is connected to the output terminals 50 and 52 of the frequency compensator 12. The voltage reference network 14 in this instance comprises two non-linear impedance circuits 54 and 56 disposed to supply full-wave dry-type rectifiers 58 and 60, respectively. The non-linear impedance circuit 54 comprises a series-connected capacitor 62 and a saturable reactor 64, whereas the non-linear impedance circuit 56 comprises a parallel-connected capacitor 66 and a saturable reactor 68. An isolating transformer 70 is disposed in the non-linear circuit 56 to isolate the components thereof and the components of the non-linear circuit 56 from the rectifiers 58 and 60 to prevent circulating currents therein. The electrical characteristics of the non-linear impedance circuits 54 and 56 will be referred to and described more fully hereinafter.

In order to provide for obtaining a variable output from the voltage reference network 14 in accordance with the deviation of the voltage across conductors 22 and 24 from the predetermined value which is to be maintained substantially constant, the output terminals of the rectifiers 58 and 60 are connected in circuit relation with a resistor 72, different portions or sections of which are disposed to be connected in circuit relation with the respective rectifiers, as by means of a sliding contact member 74. Thus, the portion 71 of the resistor 72 connected between the contact member 74 and one of the output terminals of the rectifier 60 will provide a potential which is a measure of the output of the rectifier 60, and the portion of the resistor 72 connected between the movable contact member 74 and one of the output terminals of the rectifier 58 will provide a potential which is a measure of the output of the rectifier 58. In order to provide for adjusting the potential across the section 73 of the resistor 72 so as to obtain a substantially zero net effective potential across the resistor 72, a movable contact member 76 is provided for movement for controlling the size of the portion 73 of the resistor 72 in circuit relation with the rectifier 58. By adjusting the position of the contact member 76, a net effective zero potential may be obtained across the resistor 72 for a given voltage across load conductors 22 and 24 which is to be maintained substantially constant.

In order to effectively amplify the output from the voltage reference network 14 so as to obtain sufficient power for controlling the excitation of the regulating generator 18, the magnetic amplifier 16 is connected in circuit relation between the output terminals 75 and 77 of the voltage reference network 14 and the opposed control field windings 34 and 36 of the regulating generator 18. The magnetic amplifier 16 illustrated comprises four saturable reactors 78, 80, 82 and 84. Each of the saturable reactors is provided with an alternating-current winding 86, 88, 90 and 92, respectively, connected to supply the control field windings 34 and 36. Any suitable source of alternating-current power supply may be utilized although in this instance a potential transformer 94 is employed, the potential transformer 94 having its primary winding connected across the load conductors 24 and 26. The transformer 94 is provided with two secondary windings 96 and 98, the secondary winding 96 being disposed to supply the alternating-current windings 86 and 88 of the reactors 78 and 80, respectively, which alternating-current windings are connected in series circuit relation with each other and are connected to the input terminals of a dry-type rectifier 100. Likewise, the secondary winding 98 of the transformer 94 is connected to supply the alternating-current windings 90 and 92 of the reactors 82 and 84, respectively, the alternating-current windings 90 and 92 being connected in series circuit relation with one another and in circuit relation with the input terminals of a dry-type rectifier 102. As illustrated, the output terminals of the rectifiers 100 and 102 are connected to supply the control field windings 34 and 36, respectively, a resistor 104 being connected intermediate an output terminal of the rectifier 100 and an output terminal of the rectifier 102 and the midpoint of the resistor 104 being connected to the control field windings 34 and 36. These later connections provide a potential drop across sections 103 and 105 of the resistor 104 which is a measure of the excitation of the control field windings 34 and 36. The resistor 104 is provided with movable contact members 106 and 108 for adjusting the potential drop across the sections 103 and 105 of the resistor 104 which are connected in circuit relation with the rectifiers 100 and 102, respectively.

As illustrated, a plurality of direct-current control windings 110, 112, 114 and 116, are provided on the reactors 78, 80, 82 and 84, respectively, to control the impedance of the alternating-current windings 86, 88, 90 and 92, respectively. The control windings 110 and 112 are connected in series circuit relation with respect to one another, and the control windings 114 and 116 are also connected in series circuit relation with respect to each other. However, the series circuit-connected windings 110 and 112 are connected in parallel relation with the series circuit-connected control windings 114 and 116. This parallel circuit is connected to input terminals 118 and 120, which are in turn connected by conductors 122 and 124 through movable contact members 126 and 128, respectively, of a manually operated switch 130, which will be referred to hereinafter, and conductors 132 and 134, respectively, to the terminals 77 and 75, respectively, of the resistor 72 whereby the control windings 110, 112, 114 and 116 are energized in accordance with the net effective potential across the resistor 72, the direction of current flow through these windings being dependent upon the polarity of the net effective potential across the resistor 72.

In addition to the direct-current control windings 110, 112, 114 and 116, each of the reactors 78, 80, 82 and 84 is provided with a biasing direct current control winding 136, 138, 140 and 142, respectively, which windings likewise serve as feedback windings. The biasing windings 136 and 138 are connected in series circuit relation with one another and are connected across section 103 of the resistor 104 so as to be energized in accordance with the potential across such section and in accordance with the flow of current from the rectifier 100 through the control field winding 34 of the regulating generator 18. Likewise, the biasing windings 140 and 142 are connected in series circuit relation with one another across section 105 of the resistor 104 so as to be energized in accordance with the potential across such section of the resistor 104 and in accordance with the flow of current from the rectifier 102 through the control field winding 36 of the regulating generator 18. It is to be noted that the biasing windings 136 and 138 are so disposed on the reactors 78 and 80, respectively, that the flux produced by the current flowing through such biasing windings is additive to the flux produced by the current flowing through the direct-current control windings 110 and 112, respectively, when the flux produced by the current flowing through the biasing windings 140 and 142 is at any instance in opposition to the flux produced by the current flowing through the direct-current control windings 114 and 116, respectively, of the reactors 82 and 84, respectively. On the other hand, when the flux produced by the direct-current control windings 110 and 112 of the reactors 78 and 80 is in opposition to the flux produced by the biasing windings 136 and 138, respectively, then it is to be noted that the flux produced by the current flow through the direct-current control windings 114 and 116 of reactors 82 and 84, respectively, is additive to the flux produced by the current flow through the biasing windings 140 and 142, respectively. The polarity of the potential across the resistor 72 of the voltage reference network 14 will determine whether or not the fluxes of the direct-current control windings 110 and 112 of the reactors 78 and 80, respectively, is additive or in opposition to the flux produced as a result of the energization of the biasing windings 136 and 138, respectively.

Each of the reactors 78, 80, 82 and 84 is also provided with a damping winding 144, 146, 148 and 150, respectively, for controlling the saturation of the reactors in accordance with the rate of change in the excitation of the generator field winding 28. Thus, the flux resulting from the rate of change of the excitation voltage of the generator 10 will oppose the flux of the direct-current control winding associated therewith on each of the reactors 78, 80, 82 and 84. For this purpose, the damping control windings 144, 146, 148 and 150 are connected in series circuit relation to be supplied in accordance with the output of the regulating generator 18, such control windings being connected to the output of the regulating generator 18 through a potential transformer 152.

As will be appreciated, under certain conditions, it will be desirable to effect a manual regulation of the output of the generator 10 instead of the automatic regulation, which can be obtained with the regulating system just described. For this purpose, a manual control circuit 154 is provided, the switch 130 being disposed for operation to disconnect the output of the voltage reference network 14 from the amplifier 16 and to connect the manual control circuit 154 to the magnetic amplifier. The switch 130 comprises a plurality of movable contact members 126, 128, 156, 158, 160 and 162, the contact members 126 and 128 being disposed in circuit-making position to establish the automatic regulating system when the switch 130 is in the position illustrated. The contact members 156, 158, 160 and 162 are in the circuit-opening position when the contact members 126 and 128 are in the circuit-closing position. For a manual regulation of the generator 10, the switch 130 is actuated so as to move the contact members 126 and 128 to a circuit-opening position and the contact members 156 through 162 to a circuit-closing position.

The manual control circuit 154 comprises a suitable bridge circuit, the input terminals 164 and 166 of which are disposed to be connected across the output circuit of the regulating generator 18 when the switch 130 is in the manual control position. As illustrated, the manual control circuit comprises a suitable bridge circuit having four legs, one of the legs comprising a resistor 168, another leg comprising a pair of parallel but opposed rectifiers 170 and 172, the other legs being formed of a resistor 174, which has an adjustable contact member 176 disposed for movement intermediate the ends of the resistor 174, the movable contact member 176 being connected to an output terminal 178 of the bridge circuit, the other output terminal 180 of the bridge circuit being connected intermediate the legs formed by the resistor 168 and the parallel-connected rectifiers 170 and 172. Thus, with the switch 130 disposed for a manual operation of the system, the contact members 156 and 158 connect the output terminals 178 and 180 of the bridge circuit to the direct-current control windings 110, 112, 114 and 116 of the reactors 78, 80, 82 and 84, respectively, to control the output of the magnetic amplifier and thereby control the energization of the generator 10. By adjusting the movable contact member 176, the output potential and the polarity of the manual control bridge 154 can be readily controlled manually.

Before putting the regulating system embodying the teachings of this invention into use, certain adjustments of the apparatus must be made. The movable contact member 46 of the frequency-compensating circuit 12 should be adjusted until it completes an electrical circuit to the proper capacitor 44 in order that proper frequency compensation may be obtained. When the proper frequency compensation is obtained, the voltage input to the voltage reference network 12 will be substantially unaffected by changes in frequency of the alternating-current generator 10.

The slidable contact members 76 and 74 of the voltage reference network 14 are adjusted so that there is no voltage at the output of the voltage reference network 14 when the output voltage from the alternating-current generator 10 is at its regulated value. As regards the magnetic amplifier 16, the slidable contact members 106 and 108 are adjusted until the flux produced by the direct current flow through the field windings 34 and 36 of the generator 18 is in opposition and equal in magnitude when the output voltage from the alternating-current generator 10 is at its regulated value.

The voltage divider 48 should then be adjusted until the voltage input to the voltage reference network 14 is of such a magnitude that the proper correction voltage can be applied to the field winding 28 of the alternating-current generator 10 to thus maintain the output voltage of the alternating-current generator 10 at its regulated value.

In operation, with the switch 130 positioned as shown in Fig. 1A of the drawings, in which the movable contact members 126 and 128 are in the circuit closing position and the movable contact members 156 through 162 are in the circuit interrupting position, if there is an increase or decrease in the magnitude of the voltage output of the alternating-current generator 10 from its regulated value, a measure of this increase or decrease in voltage will appear across the output terminals 50 and 52 of the frequency-compensating circuit 12 and thus across the input to the voltage reference network 14. As hereinbefore mentioned, the frequency-compensating circuit 12 maintaining the input voltage to the voltage reference network 14 is unaffected by the frequency of the alternating-current generator 10.

Referring to Fig. 2 of the drawings, there is illustrated a graph, the curves of which represent the electrical characteristics of the nonlinear impedance circuits 54 and 56 utilized in the system shown in Figs. 1A and 1B. Curve 182 represents the magnitude of the current flow through the capacitor 66 and the saturating reactor 68 for various magnitudes of voltages that are impressed across the input terminals 50 and 52 to the voltage reference network 14. Curve 184 represents the magnitude of the current flow through the capacitor 62 and the saturating reactor 64 for various voltages that are impressed across the input terminals 50 and 52 to the voltage reference network 14. When the voltage impressed across the input terminals 50 and 52 to the voltage reference network 14 has a magnitude equal to that represented by 186 on the graph, the current flow through the two non-linear impedance circuits 54 and 56 will be of equal magnitude. When the current flow through these two non-linear impedance circuits is of equal magnitude, the output voltage of the alternating-current generator 10 should be at its regulated value.

As can be seen from Fig. 2 of the drawings, with an increase in the output voltage of the alternating-current generator 10 (as represented by 188 on the graph), there will be a wide difference in the magnitude of the current that is flowing through the impedance circuit 54 comprising the capacitor 62 and the saturating reactor 64 and the impedance circuit 56 comprising the capacitor 66 and the saturating reactor 68. The current flow through the impedance circuit 56 is of a smaller magnitude than the magnitude of the current flow through the impedance circuit 54 when the output voltage of the alternating-current generator 10 is above its regulated value. A current of smaller magnitude will flow through the portion 71 of the resistor 72 that is connected to one of the output terminals of the rectifier 60 and the slidable contact member 74 than will flow through the portion 73 of the resistor 72 that is connected to one of the output terminals of the rectifiers 58 and the slidable contact member 74. The current flows in opposite directions through the portions 71 and 73 of the resistor 72 and when the magnitude of the current flowing in these two portions of the resistor 72 is not equal, there will be a voltage across the resistor 72. The polarity of this voltage and thus the direction of flow of the current that passes through the resistor 72 to the magnetic amplifier 16 will be determined by which portion of the resistor 72 has the greater magnitude of current flowing therethrough.

If the output voltage of the alternating-current generator 10 rises above its regulated value, the polarity of the net effective voltage across the resistor 72 will be such that the current to the amplifier 16 will flow through the resistor 72 in the direction of the output terminal 77 of the rectifier 60, through the conductor 132, the movable contact member 126, the conductor 122, the input terminal 118 of the amplifier 16, the parallel circuit comprising the series connected control windings 110—112 and 114—116, the input terminal 120, the conductor 124, movable contact member 128, and conductor 134, to output terminal 75 of the voltage reference network 14. The current flow through the biasing windings 136 and 138 will be in such a direction that the flux produced thereby will be additive to the flux produced by the control windings 110 and 112 respectively. However, the flux produced by the direct-current flow through the biasing windings 140 and 142 will be in opposition to that flux produced by the direct-current flow through the control windings 114 and 116 respectively. When the flux produced by the current flow through the control winding 114 is equal in magnitude and opposite to that flux produced by the direct-current flow through the biasing winding 140 and the flux produced by the direct-current flow through the control winding 116 is equal in magnitude and opposite to the flux produced by the direct-current flow through the biasing winding 142, there will be a minimum of saturation of the magnetic core members 82 and 84, the alternating-current windings 90 and 92 then offering a maximum of impedance to the current flow, and thus rendering a minimum of current flow to the field winding 36. When the flux produced by the current flow through the control windings 114 and 116 rises to a magnitude that is greater than the magnitude of the flux produced by the current flow through the biasing windings 140 and 142 respectively, there will momentarily be a current flow of greater magnitude through the alternating-current windings 90 and 92 than is the case when the flux produced by the current flow through the control winding 114 and the biasing winding 140 is equal in magnitude. When the current flow through the alternating-current windings 90 and 92 increases momentarily the output current from the rectifier 102 and hence the current flow through the biasing windings 140 and 142 increases. This increased current flow in the biasing windings 140 and 142 produces an additional biasing flux to offset and oppose the flux produced by the additional current flow through the control windings 114 and 116 after the transition point is passed where the magnitude of the flux produced by the current flow through the control winding 114 is equal in magnitude and in opposition to that flux produced by the current flow through the biasing winding 140. Therefore, the current flow through the field winding 36 remains substantially at the same minimum value first reached even though the flux produced by the current flow through the control windings 114 and 116 increases in magnitude beyond that value at which the flux produced by the control windings 114 and 116 was first equal in magnitude to the flux produced by the current flow through the biasing windings 140 and 142, respectively.

Still assuming the output voltage of the generator 10 is above its regulated value, with each increase in current flow through the control windings 110 and 112, there is a proportional increase in the total flux produced by the current flow through the control windings 110 and 112. This increased current flow in the control windings 110 and 112 further increases the saturation of the magnetic core members 78 and 80, respectively, thus lowering the impedance of the alternating-current windings 86 and 88, thus increasing the output current of the rectifier 100 to the biasing windings 136 and 138. The increased current flow through the biasing windings 136 and 138 increases the flux produced by these windings. Since the fluxes produced by the control windings 110 and 112 are additive to the fluxes produced by the biasing windings 136 and 138 respectively, the impedance of the alternating-current windings 86 and 88 is further lowered and the current flow through the field winding 34 of the control generator 18 continues to increase in proportion to the current flow through the control windings 110 and 112. Thus the feedback to the biasing windings 136, 138, 140 and 142 which likewise act as feedback windings, is such as to produce a wide difference in the magnitude of the current flow through the field windings 34 and 36 of the generator 18 when the output of the generator 10 is not at its regulated value and therefore a maximum of useful output from the magnetic amplifier 16.

The combined flux produced by the direct-current flow through the field windings 34 and 36 of the control generator 18 when the output voltage from the alternating-current generator 10 is above its regulated value causes the output voltage from the control generator 18 to decrease, thus decreasing the voltage across the field winding 28, lowering the output voltage of the alternating-current generator 10 to its regulated value.

The rapid rise in the flux produced by the current flow through the control windings 110, 112, 114 and 116 is opposed by the flux produced by the current flow through the damping windings 144, 146, 148 and 150, respectively. This prevents an overcorrection of the output voltage of the alternating-current generator 10 and renders a more stable regulating system.

If, however, the output voltage of the alternating-current generator 10 falls below the regulated value, a measure of the decreased voltage will be impressed across the input terminals 50 and 52 to the voltage reference network 14. Referring to Fig. 2 of the drawings, it can be seen that when the output voltage of the alternating-current generator 10 is below the regulated value as represented by 198, the current flow through the non-linear impedance circuit 54 will be of a smaller magnitude than the magnitude of the current flowing through the non-linear impedance circuit 56. When this operating condition exists, the current will flow through the resistor 72 of the voltage reference network 14 in a direction towards the output terminal 75, through the conductor 134, the movable contact member 128, the conductor 124, the input terminal 120 of the amplifier 16, the parallel circuit comprising the series connected control windings 110—112 and 114—116, the input terminal 118 of the amplifier 16, the conductor 122, the movable contact member 126, and the conductor 132 to the output terminal 77 of the voltage reference network 14. The current flow through the control windings 110, 112, 114 and 116 is in such a direction that the flux produced by the current flow through the control windings 110 and 112 will be opposed to the flux produced by the direct-current flow through the biasing windings 136 and 138, respectively. The current flow through the control windings 114 and 116 will be in such a direction that the flux produced thereby will be additive to that flux produced by the direct current flowing through the biasing windings 140 and 142, respectively. When the current flows in this manner through these windings of the magnetic amplifier 16, there will be an increase in the current flow through the field winding 36 over that value that exists when the output voltage of the alternating-current generator 10 is at its regulated value.

When the output voltage of the alternating-current generator is below its regulated value, the flux produced by the current flow through the control windings 110 and 112 will be in opposition to the flux produced by the current flow through the biasing windings 136 and 138, respectively, and the current flowing through the field winding 34 will be decreased and maintained at a minimum magnitude for reasons as hereinbefore mentioned. The combined flux produced by the current flow through the control field windings 34 and 36 causes the output voltage of the control generator 18 to increase to such a value that the output voltage of the alternating-current generator 10 is raised to its regulated value.

As hereinbefore mentioned, the output voltage of the alternating-current generator 10 may be manually controlled by means of the manual control 154. To switch to manual control, the switch 130 is first actuated so as to move the contact members 126 and 128 to the circuit interrupting position and the movable contact members 156, 158, 160 and 162 to the circuit-closing position. With these latter contact members so positioned, the slidable contact member 176 may be actuated towards one end or the other of the resistor 174. This effects an unbalance of the manual control circuit 154 or Wheatstone bridge in one direction or the other to either increase or decrease the output voltage of the alternating-current generator 10.

The regulating system embodying the teachings of this invention has several advantages. As hereinbefore mentioned, a large percent of the power input to the voltage reference network 14 is utilized in maintaining the output voltage of the alternating-current generator 10 substantially constant. Since a smaller amount of power is required in operating the regulating system, its size can be considerably decreased. Oftentimes, such a decreased size is invaluable when there are space limitations.

I claim as my invention:

1. In a regulating system for maintaining an electrical quantity substantially constant, the combination comprising, a network disposed to be energized in accordance with the electrical quantity and responsive to variations therein to produce an output voltage, the polarity of which depends upon the magnitude of the electrical quantity, the network comprising a first non-linear impedance circuit and a second non-linear impedance circuit disposed to be simultaneously energized in accordance with the electrical quantity, the first non-linear impedance circuit comprising a saturating reactor and a capacitor connected in series circuit relation, the second non-linear impedance circuit comprising a saturating reactor and a capacitor connected in parallel circuit relation, a dry type rectifier unit connected to be supplied by the first non-linear impedance circuit, another dry type rectifier unit connected to be supplied by the second non-linear impedance circuit, circuit means connected to the output terminals of said dry type rectifier unit and to said another dry type rectifier unit for producing the output voltage for the network, a magnetic amplifier responsive to the output voltage of the network, the magnetic amplifier comprising two pairs of magnetic core members, an alternating-current load winding disposed on each of the magnetic core members, two rectifiers of the dry type for rectifying the output of the amplifier, the amplifier rectifiers having input and output terminals, means for connecting the alternating-current windings on one pair of magnetic core members to the input terminals of one of the amplifier rectifiers and means for connecting the alternating-current windings on the other pair of magnetic core members to the input terminals of the other amplifier rectifier, a control winding disposed on each of the magnetic core members, the direction and magnitude of the current flow through the control windings being dependent upon the polarity of the output voltage of the network, a biasing winding disposed on each of the magnetic core members, the biasing windings on said one pair of the magnetic core members being responsive to the output of said one of the amplifier rectifiers, the biasing windings disposed on said other pair of the magnetic core members being responsive to the output of said other amplifier rectifier, and the biasing windings on one pair of magnetic core members being so disposed that for a predetermined directional output from the network the flux produced by the current flow through the biasing windings is in magnetic opposition to the flux produced by the current flow through the control windings on the same pair of magnetic core members while the flux produced by the current flow through the biasing windings disposed on the other pair of magnetic core members is additive to the flux produced by the current flow through the control windings on the said other pair of magnetic core members, and control means responsive to the output of the two amplifier rectifiers for controlling the electrical quantity.

2. In a regulating system for maintaining an electrical quantity substantially constant, the combination comprising, a network disposed to be energized in accordance with the electrical quantity and responsive to variations therein to produce an output voltage, the polarity of which depends upon the magnitude of the electrical quantity, the network comprising, a first non-linear impedance circuit and a second non-linear impedance circuit disposed to be simultaneously energized in accordance with the electrical quantity, the first non-linear impedance circuit comprising a saturating reactor and a capacitor connected in series circuit relation, the second non-linear impedance circuit comprising a saturating reactor and a capacitor connected in parallel circuit relation, a dry type rectifier unit connected to be supplied by the first non-linear impedance circuit, another dry type rectifier unit connected to be supplied by the second non-linear impedance circuit, circuit means connected to the output terminals of said dry type rectifier unit and to said another dry type rectifier unit for producing the output voltage for the network, a magnetic amplifier responsive to the output voltage of the network, the magnetic amplifier comprising two pairs of magnetic core members, an alternating-current load winding disposed on each of the magnetic core members, two rectifiers of the dry type for rectifying the output of the amplifier, the amplifier rectifiers having input and output terminals, means for connecting the alternating current windings on one pair of magnetic core members to the input terminals of one of the amplifier rectifiers and means for connecting the alternating-current windings on the other pair of magnetic core members to the input terminals of the other amplifier rectifier, a control winding disposed on each of the magnetic core members, the direction and magnitude of the current flow through the control windings being dependent upon the polarity of the output voltage of the network, a biasing winding disposed on each of the magnetic core members, another resistance member connected between an output terminal of one of the amplifier rectifiers and an output terminal of the other amplifier rectifier, the biasing windings on one pair of magnetic core members being connected between one end of said other resistance member and an intermediate point thereof, the biasing windings on the other pair of magnetic core members being connected between said intermediate point of said other resistance member and its other end, and the biasing windings on one pair of magnetic core members being so disposed that for a predetermined directional output from the network the flux produced by the current flow through the biasing windings is in magnetic opposition to the flux produced by the current flow through the control windings on the same pair of magnetic core members when the flux produced by the current flow through the biasing windings disposed on the other pair of magnetic core members is additive to the flux produced by the current flow through the control windings on said other pair of magnetic core members, and control means responsive to the output of the two amplifier rectifiers for controlling the electrical quantity.

3. In a regulating system for maintaining the output voltage of an alternating-current generator substantially constant, the combination comprising, a frequency compensating circuit responsive to the output voltage of the alternating-current generator for maintaining the voltage output of the frequency compensator circuit substantially constant irrespective of the frequency of the alternating-current generator, a network disposed to be energized in accordance with the output of the frequency compensator circuit to produce an output voltage, the polarity of which depends upon the magnitude of the output voltage of said generator, the network comprising a first non-linear impedance circuit and a second non-linear impedance circuit disposed to be simultaneously energized in accordance with the electrical quantity, the first non-linear impedance circuit comprisng a saturating reactor and a capacitor connected in series circuit relation, the second non-linear impedance circuit comprising a saturating reactor and a capacitor connected in parallel circuit relation, a dry type rectifier unit connected to be supplied by the first non-linear impedance circuit, another dry type rectifier unit connected to be supplied by the second non-linear impedance circuit, circuit means connected to the output terminals of said dry type rectifier unit and to said another dry type rectifier unit for producing the output voltage for the network, a magnetic amplifier responsive to the output voltage of the network, the magnetic amplifier comprising two pairs of magnetic core members, an alternating-current load winding disposed on each of the magnetic core members, two rectifiers of the dry type for rectifying the output of the amplifier, the amplifier rectifiers having input and output terminals, means for connecting the alternating-current windings on one pair of magnetic core members to the input terminals of one of the amplifier rectifiers and means for connecting the alternating-current windings on the other pair of magnetic core members to the input terminals of the other amplifier rectifier, a control winding disposed on each of the magnetic core members, the direction and magnitude of the current flow through the control windings being dependent upon the polarity of the output voltage of the network, a biasing winding disposed on each of the magnetic core members, another resistance member connected between an output terminal of one of the amplifier rectifiers and an output terminal of the other amplifier rectifier, the biasing windings on one pair of magnetic core members being connected between one end of the said other resistance member and an intermediate point thereof, the biasing windings on the other pair of magnetic core members being connected between said intermediate point of said other resistance member and its other end, the biasing windings on one pair of magnetic core members being so disposed that for a predetermined directional output from the network the flux produced by the current flow through the biasing windings is in magnetic opposition to the flux produced by the current flow through the control windings on the same pair of magnetic core members when the flux produced by the current flow through the biasing windings disposed on the other pair of magnetic core members is additive to the flux produced by the current flow through the control windings on said other pair of magnetic core members, and control means responsive to the output of the two amplifier rectifiers for controlling the electrical quantity.

SCHUYLER L. BRADLEY.

References Cited in the file of this patent

UNITED STATES PATENTS

| Number | Name | Date |
|---|---|---|
| 2,138,732 | Craig | Nov. 29, 1938 |
| 2,367,625 | Short | Jan. 16, 1945 |
| 2,443,665 | Rustebakke | June 22, 1948 |
| 2,447,655 | Kirshbaum | Aug. 24, 1948 |
| 2,464,551 | Bockman | Mar. 15, 1949 |
| 2,475,575 | Tweedy | July 5, 1949 |
| 2,477,991 | Lamm | Aug. 2, 1949 |
| 2,482,482 | Harder et al. | Sept. 20, 1949 |
| 2,504,675 | Forssell | Apr. 18, 1950 |
| 2,509,865 | Hedstrom et al. | May 30, 1950 |
| 2,541,820 | Ker | Feb. 13, 1951 |
| 2,549,250 | Sikorra et al. | Apr. 17, 1951 |